United States Patent [19]
Kelso

[11] 3,783,177
[45] Jan. 1, 1974

[54] INSULATING CAP

[75] Inventor: James W. Kelso, Los Angeles, Calif.

[73] Assignee: Cintex Products, Inc., Los Angeles, Calif.

[22] Filed: Feb. 26, 1973

[21] Appl. No.: 335,649

Related U.S. Application Data

[63] Continuation-in-part of Ser. No. 286,027, Sept. 5, 1972, abandoned.

[52] U.S. Cl................. 174/87, 174/76, 174/138 F, 206/47 A
[51] Int. Cl............................................ H02g 15/08
[58] Field of Search................. 174/87, 76 R, 84 R, 174/84 C, 138 F; 206/47 A; 339/115 R, 115 C, 116 R, 116 C

[56] References Cited
UNITED STATES PATENTS

| | | | |
|---|---|---|---|
| 3,083,260 | 3/1963 | Bird | 174/87 |
| 3,087,606 | 4/1963 | Bollmeier et al. | 174/87 UX |
| 3,359,361 | 12/1967 | Oakman | 174/76 |
| 3,385,922 | 5/1968 | Rice | 174/84 R |
| 3,548,562 | 12/1970 | Schwartzman | 206/47 A |
| 3,550,765 | 12/1970 | Anderson | 174/87 X |
| 3,558,800 | 1/1971 | Wallis et al. | 174/87 |

Primary Examiner—Darrell L. Clay
Attorney—Keith D. Beecher

[57] ABSTRACT

An improved insulating cap is provided for the spliced exposed ends of a pair of insulated electric wires. The cap may be readily fitted over the spliced ends, and it is firmly and permanently held in place to provide a complete insulating cover for the exposed ends. The cap of the invention is provided with two internal chambers separated by a membrane. An insulating adhesive material, such as an epoxy resin, is held in a liquid condition in one of the chambers; and a hardener activator for the epoxy resin is held in the other chamber. The membrane provides an air tight and moisture tight seal for the activator. When the cap is fitted over the exposed spliced ends of the wires, the ends pierce the membrane and cause the activator and resin to run together so that the resin may be activated and cured rapidly to a hard insulating condition. The membrane closing the reactor chamber is treated with a coating, such as paraffin, to render the membrane impervious to corrosive attack from the activator. The activator is selected to set up an exothermic reaction when mixed with the resin, so as to provide for the rapid and thorough intermixing of the two ingredients for a complete bonding of the resin. In addition, the reaction is such that the resin forms into a firm bond within a matter of seconds, so as to facilitate the use of the cap.

8 Claims, 3 Drawing Figures

PATENTED JAN 1 1974 3,783,177

INSULATING CAP

This application is a continuation-in-part of copending application Ser. No. 286,027 filed Sept. 5, 1972, now abandoned.

BACKGROUND OF THE INVENTION

The requirement often arises in the electric wiring art for one wire to be joined and electrically connected to another. This is usually achieved by stripping the ends of each wire so as to expose the bare copper conductors, and by then twisting the exposed ends together as a splice. It is also common practice to enclose the splice by an insulating cap, which has a metal liner, and which is screwed or crimped into position over the splice.

However, such prior art caps are subject to certain disadvantages, in that they often fail to provide a complete insulating cover for the wire, and also in that the connection often fails due to excessive or insufficient crimping or spreading action. This means that wires enclosed by such prior art insulating caps are often subject to failure with resulting arcing and short-circuiting hazards. Such hazards can be especially serious when the connections are made in an environment of combustible fumes, since arcing and short-circuiting can then often result in serious fires and explosions.

The cap of the present invention is simple and economical in its construction, and it is easier to use than the prior art cap described above, since no crimping or screwing action is required. The cap of the invention forms a permanent insulating resin bond over the spliced wires which is not subject to failure. The hardened resin bond not only serves to retain the cap permanently on the spliced ends of the wires, without any need for crimping, but it also provides a complete insulating sheath for the exposed ends.

Insulating caps for covering the spliced bare ends of electric wires, and which include a bonding agent that is initially separated within the cap from a setting agent, are known to the art. Such prior art insulating caps usually include a thin membrane which, like the cap of the present invention, is ruptured when the cap is fitted over the spliced ends of the wires. However, such prior art devices, for the most part, do not exhibit sufficient shelf life. In addition, there is usually insufficient mixing between the bonding and setting agents in the prior art devices to form a suitable bond when the membrane is ruptured. Moreover, the reaction time between the setting and bonding agents of the prior art assemblies is usually relatively slow which renders the use of such assemblies somewhat awkward and time consuming.

It has been found that the reason for the limited shelf life of the prior art assemblies is that most reactor agents respond to moisture and, as a result, generate corrosive gases. These gases attack the membranes and destroy their capabilities for separating the reactor from the bonding agents. As will be described, the assembly of the present invention uses disiccants in the cap to reduce moisture to a minimum. Also, a metallic membrane, formed, for example, of aluminum foil is used in conjunction with a collar and shoulder to assure an air tight and moisture tight seal for the reactor chamber. Additionally, the membrane itself is coated with paraffin, or other appropriate material to immunize the membrane from corrosive attack.

A further feature of the assembly of the present invention is the use of a resin and activator which react with one another in an exothermic reaction to create a rapid and thorough intermixing of the two ingredients so that a reliable and complete hard resin bond may be formed. Also, the reaction is sufficiently rapid so that the bond is formed in a mater of seconds.

DETAILED DESCRIPTION OF THE ILLUSTRATED EMBODIMENT

Figure 1:
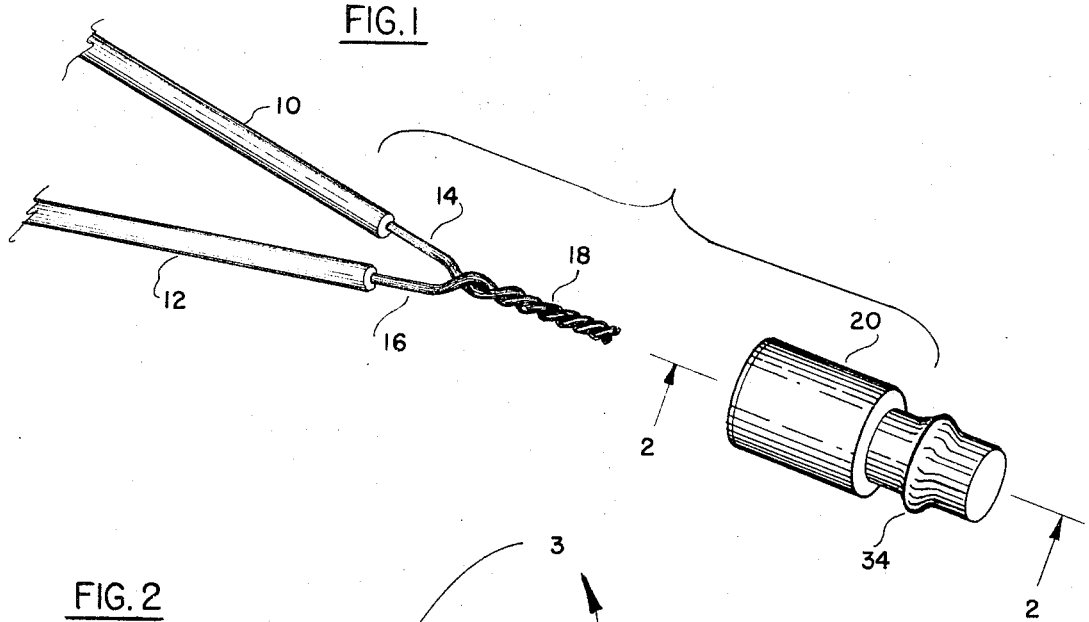
FIG. 1 is an exploded representation of a splice and an insulating cap, the cap being constructed to incorporate the concepts of the invention.

As shown in FIG. 1, an electric wire 10 may be connected and joined to an electric wire 12 by stripping the insulation from the end of each wire, and by splicing the exposed copper conductors 14 and 16 to form a splice 18. The splice 18 may then be protected by slipping a cap 20 over the splice. The cap 20 is constructed to incorporate the concepts of the present invention, and, as such, it includes a membrane 22 which extends across the cap to form a first compartment or chamber A with the closed right hand end of the cap. The cap also includes a cover 24 extending over the open end of the cap. The cover forms a closure for a second compartment or chamber B. The cover may be a removable plastic disc, or it also may be a membrane, heat sealed to the end of the cap housing. A collar 26 holds the membrane 22 in place and forms a complete moisture proof and air tight seal around the edge of the membrane 22.

The chamber B is filled with an appropriate reactor setting agent; and the chamber A is filled with an epoxy resin, or other appropriate bonding material. A suitable epoxy resin is Shell Epon 828. Lewis acid type resin hardeners have been found to be appropriate as a setting agent.

In the use of a membrane for the cover 24, it is pierced by the splice 18, as the splice is inserted into the chamber B. The splice is then inserted through the membrane 22 into the chamber A. As the splice pierces the membrane 22, the reactor in the chamber B is drawn into the chamber A and intermixes with the resin in the chamber A. A resulting exothermic reaction is set up in the chambers A and B which provides for the rapid and complete intermixing of the reactor with the resin. The resulting interaction between the two ingredients causes the resin rapidly to cure to a hard insulating mass. This insulating mass serves completely to cover the splice 18, and firmly and permanently to bond the cap to the splice. When a membrane is used for cover 24, and when it is pierced by the splice, reaction gases are trapped within the cap, resulting in improved hardening and in improved physical properties of the final seal.

Figure 2:
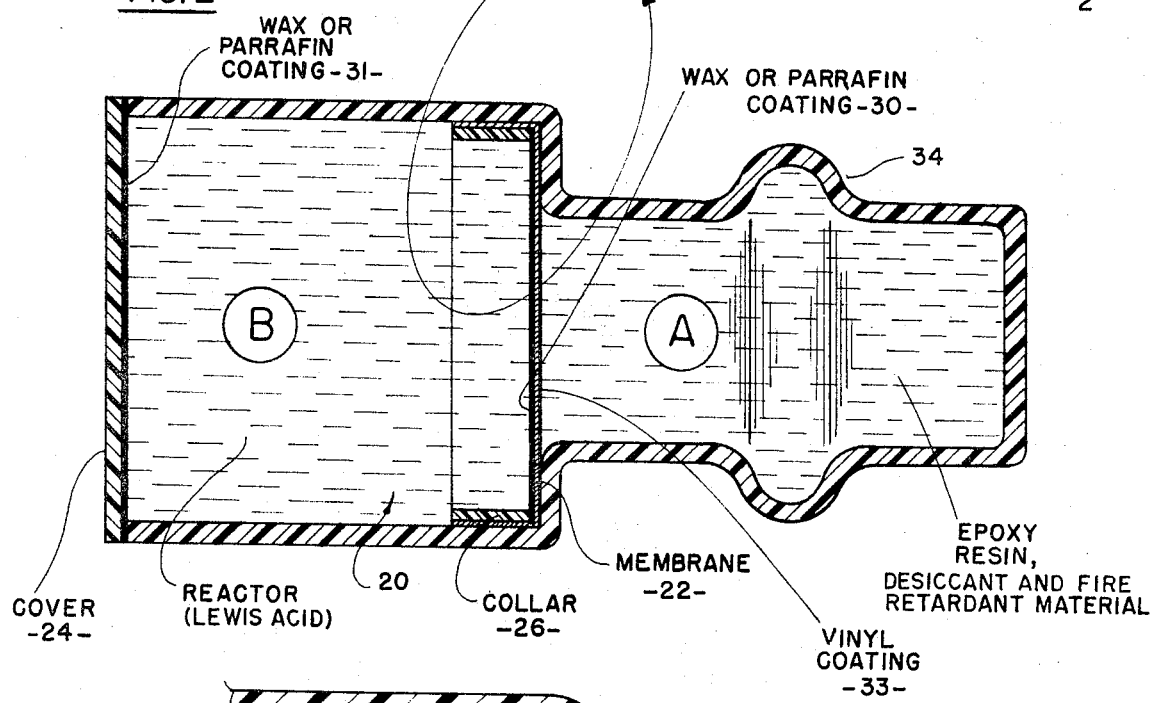
FIG. 2 is an enlarged section of the cap of FIG. 1, taken along the line 2—2 of FIG. 1.
Figure 3:
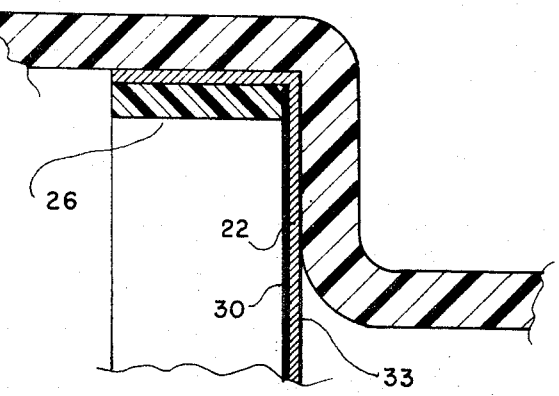
FIG. 3 is an enlarged view of a portion of the section of FIG. 2.

In order to preserve the shelf life of caps of the type shown in FIG. 2, it is essential that the reactor in the chamber B be kept moisture free over sustained time period, and under all types of ambient conditions. Any moisture entering the chamber B causes the reactor to develop corrosive gases, such as hydrofluoric acid, which would normally attack the membranes 22 and 24, and destroy the barrier between the two chambers A and B.

The cap assembly of the present invention is constructed particularly to assure that a minimum of moisture will enter the chamber B, even after sustained time periods and under adverse moisture conditions. The unit is also constructed so that the membrane 22 is impervious to corrosive attacks of any residual corrosive gases which may be generated by the reactor. An annular bulge 34 may be formed in the cap to act as an interlock to hold the splice and hardened resin in the cap.

The assembly is rendered moisture proof by means, for example, of aluminum or ferrous foil membranes 22 and 24, each of which has a thickness of the order of 1 mil. The foil of membrane 22 is held firmly in place by means of the collar 26, which effectively seals the foil to the wall of the chamber B so as to preserve the moi-ture proof integrity of the membrane and to render the chamber B air tight. The sides of the members 22 and 24 facing the chamber B are coated with respective coatings 30 and 31 of paraffin, wax, petroleum jelly, or other corrosive-proof material. The side of the membrane 22 facing the chamber A may have a vinyl coating 33 to protect the membrane from attack by the resin.

An appropriate disiccant, such as copper chloride, talc, plaster of paris, or the like is intermixed with the resin in the chamber A.

As stated above, an appropriate epoxy resin, such as Shell Epon 828, is used in the chamber A, and an appropriate desicant, as described, may be mixed with the resin. In addition, a suitable fire retardant substance, such as antimony oxide, may be mixed with the resin so as to render the complete assembly fire resistant. As also stated, the hardener in chamber B may be one of the Lewis acids to assure an exothermic, quick setting reaction. The Lewis acids include aluminum chloride ($AlCl_3$); aluminum bromide ($AlBr_3$); zinc chloride ($ZnCl_2$); sodium tetrafluoroborate ($NaBF_4$); ferric chloride ($FeCl_3$); et al.

The invention provides, therefore, an improved insulating cap for spliced ends of a pair of electric wires, and for related purposes, which is most advantageous in that it may be quickly and easily slipped over the exposed ends of the wires and, when in place, it quickly becomes permanently and firmly bonded to the wires in a manner such that the exposed ends are completely covered and completely insulated. The use of the cap of the invention insures that the two wires of the splice will be completely and firmly bonded to one another, without any tendency for the splice to fail.

A feature of the invention is the fact that the cap assembly exhibits an adequate shelf life, since there is no tendency for the membrane to deteriorate during prolonged periods of inactivity. Moreover, the assembly is such that a rapid and thorough intermixing of the ingredients occurs when the cap is used, so as to assure a rapid and complete and reliable bond between the cap and the wires. The assembly may also be treated to be fire resistant, as described above.

It will be appreciated that although a particular embodiment of the invention has been shown and described, modifications may be made. It is intended in the claims to cover the modifications which come within the spirit and scope of the invention.

What is claimed is:

1. A cap for covering and insulating the exposed electrically conductive end of an electric wire comprising: a tubular housing having an open end and a closed end and having an annular shoulder formed on the inner surface of said housing at a position intermediate the ends thereof; a membrane member in said housing engaging said shoulder and forming a first closed chamber within said housing with the closed end thereof; an annular collar mounted in said housing and engaging the peripheral edge of said membrane member and forcing said edge against said shoulder to form an air tight and a moisture tight seal between said membrane and said shoulder; a cover for said housing mounted on said open end thereof to form a second closed chamber within said housing; a charge of flowable uncured settable substance contained in one of said chambers; and a charge of a reactor curing agent for said settable substance contained in the other of said chambers.

2. The combination defined in claim 1, and which includes a coating of anti-corrosive material on the surface of said membrane facing said reactor curing agent.

3. The combination defined in claim 1, in which said membrane is formed of aluminum or ferrous foil, and which includes a coating of corrosive-resistant substance on the surface of said membrane facing said reactor curing agent.

4. The combination defined in claim 1, and which includes desiccant material mixed with said settable substance.

5. The combination defined in claim 1, and which includes an annular bulge formed around the periphery of said cap.

6. The combination defined in claim 1, and which includes a fire retardant material intermixed with said uncured settable substance.

7. The combination defined in claim 1, in which said uncured settable substance is an epoxy resin.

8. The combination defined in claim 8, in which said reactor curing agent is a Lewis acid.

* * * * *